United States Patent
Tillack et al.

(10) Patent No.: US 11,554,634 B2
(45) Date of Patent: Jan. 17, 2023

(54) VEHICLE AIR HANDLING SYSTEM FOR APPORTIONING AIRFLOW BETWEEN PASSENGER AND CARGO COMPARTMENTS

(71) Applicant: The Boeing Company, Chicago, IL (US)

(72) Inventors: Bryce A. Tillack, Mukilteo, WA (US); Myles E. Brown, Bothell, WA (US); Timothy T. Hanusa, Redmond, WA (US); Michael D. Williams, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 453 days.

(21) Appl. No.: 16/589,860

(22) Filed: Oct. 1, 2019

(65) Prior Publication Data
US 2021/0094387 A1 Apr. 1, 2021

(51) Int. Cl.
*B60H 1/00* (2006.01)
*B64D 13/06* (2006.01)

(52) U.S. Cl.
CPC ......... *B60H 1/00821* (2013.01); *B64D 13/06* (2013.01); *B60H 2001/00185* (2013.01); *B64D 2013/0618* (2013.01)

(58) Field of Classification Search
CPC ...... B60H 1/00821; B60H 2001/00185; B64D 13/06; B64D 2013/0618
See application file for complete search history.

(56) References Cited

U.S. PATENT DOCUMENTS

| | | | |
|---|---|---|---|
| 9,889,939 B2* | 2/2018 | Zhang | B64D 13/08 |
| 11,059,593 B2* | 7/2021 | Fagundes | B64D 13/06 |
| 2004/0231350 A1* | 11/2004 | Kline | B64D 13/00 |
| | | | 62/415 |
| 2015/0099444 A1* | 4/2015 | Le | B64D 13/06 |
| | | | 454/76 |
| 2016/0214723 A1* | 7/2016 | Fox | B64D 13/06 |

OTHER PUBLICATIONS

Pressurization, Ventilation and Oxygen Systems Assessment for Subsonic Flight Including High Altitude Operation ;USDOT (Year: 1996).*

* cited by examiner

*Primary Examiner* — Gordon A Jones
(74) *Attorney, Agent, or Firm* — Vivacqua Crane, PLLC

(57) ABSTRACT

An air handling system for distributing airflow in a vehicle is disclosed and includes a passenger compartment configured to contain one or more occupants, a cargo compartment, and a flow regulating valve configured to actuate into a commanded position to apportion airflow between the passenger and cargo compartments. The air handling system also includes one or more processors in electronic communication with the flow regulating valve and a memory coupled to the one or more processors. The memory stores data comprising a database and program code that, when executed by the one or more processors, causes the air handling system to receive one or more signals indicating a total available airflow rate available to the vehicle and a system configuration. The one or more processors instruct the flow regulating valve to actuate into a commanded position. The commanded position is calculated based on at least a target cargo airflow rate.

20 Claims, 6 Drawing Sheets

VEHICLE AIR HANDLING SYSTEM FOR APPORTIONING AIRFLOW BETWEEN PASSENGER AND CARGO COMPARTMENTS

INTRODUCTION

The present disclosure relates to an air handling system for a vehicle. More particularly, the present disclosure is directed towards an air handling system that apportions airflow between a passenger compartment and a cargo compartment of a vehicle.

BACKGROUND

An aircraft typically includes an environmental control system (ECS) that provides a passenger compartment and a cargo compartment with a conditioned flow of air. When the aircraft is on the ground, high-temperature compressed air for the ECS may be obtained from an auxiliary power unit (APU), a ground cart (GCU), or the aircraft engines. However, when the aircraft is in flight, high-temperature compressed air is obtained from the compressor stages of the aircraft engines. The high-temperature compressed air obtained from the aircraft engines may be referred to as bleed air. The bleed air is cooled by one or more heat exchangers to a predetermined temperature. The bleed air may be dehumidified as well. The bleed air is then combined with recirculated air in a mixing manifold to create the conditioned air. The conditioned air within the mix manifold is then apportioned between the passenger compartment and the cargo compartment.

It is to be appreciated that the amount of available conditioned airflow for an aircraft is finite. Accordingly, sometimes it may not be possible to supply the required amount of conditioned airflow to all areas of the aircraft. Specifically, the passenger cabin requires a minimum amount of outside conditioned airflow per occupant. The cargo compartment also requires conditioned air to meet the heating, cooling, and ventilation requirements of the cargo stored therein. For example, the heating, cooling, and ventilation requirements for luggage or other inanimate objects is quite different when compared to the requirements for live animals. However, since the total amount of available conditioned airflow is limited, either the number of occupants in the passenger cabin are reduced or, alternatively, the heating and cooling performance of the cargo compartment is limited. For example, in some aircraft, the flow rate of conditioned air to the cargo compartment is fixed. However, this reduces the amount of conditioned air available to the passenger compartment. Since each occupant requires a minimum amount of outside conditioned airflow, the available seating in the passenger compartment is reduced.

SUMMARY

According to several aspects, an air handling system for distributing airflow in a vehicle is disclosed. The air handling system includes a passenger compartment configured to contain one or more occupants, a cargo compartment, a flow regulating valve configured to actuate into a commanded position to apportion the airflow between the passenger compartment and the cargo compartment, one or more processors in electronic communication with the flow regulating valve, and a memory coupled to the one or more processors. The memory stores data comprising a database and program code that, when executed by the one or more processors, causes the air handling system to receive one or more signals indicating a total available airflow rate available to the vehicle and a system configuration, where the system configuration indicates one or more operating conditions of the vehicle. The air handling system is further caused to determine a target passenger airflow rate based on a total number of occupants contained within the passenger compartment. The air handling system is also caused to determine a target cargo airflow rate based on the total available airflow rate, the target passenger airflow rate, and the system configuration. The air handling system is also caused to instruct the flow regulating valve to actuate into the commanded position, where the commanded position is calculated based on at least the target cargo airflow rate.

In another aspect, a method for apportioning airflow between a passenger compartment and a cargo compartment of an aircraft is disclosed. The method includes receiving, by a computer, one or more signals indicating a total available airflow rate available to the aircraft and a system configuration, where the system configuration indicates a phase of flight of the aircraft. The method further includes determining, by the computer, a target passenger airflow rate based on a total number of occupants contained within the passenger compartment. The method further includes determining a target cargo airflow rate based on the total available airflow rate, the target passenger airflow rate, and the system configuration. Finally, the method includes instructing a flow regulating valve to actuate into a commanded position, where the commanded position is calculated based on at least the target cargo airflow rate and the flow regulating valve is configured to apportion conditioned air between the passenger compartment and the cargo compartment.

In yet another aspect, an aircraft including an air handling system is disclosed. The aircraft includes a passenger compartment configured to contain one or more occupants, a cargo compartment, a mixing manifold containing conditioned airflow that is apportioned between the passenger compartment and the cargo compartment, a flow regulating valve configured to actuate into a commanded position to apportion the conditioned airflow between the passenger compartment and the cargo compartment, one or more processors in electronic communication with the flow regulating valve, a memory coupled to the one or more processors. The memory stores data comprising a database and program code that, when executed by the one or more processors, causes the air handling system to receive one or more signals indicating a total available airflow rate available to the aircraft and a system configuration, where the system configuration indicates at least a phase of flight and system health of the aircraft. The air handling system is also caused to determine a target passenger airflow rate based on a total number of occupants contained within the passenger compartment. The air handling system is also caused to determine a target cargo airflow rate based on the total available airflow rate, the target passenger airflow rate, and the system configuration. The air handling system is also caused to instruct the flow regulating valve to actuate into the commanded position, where the commanded position is calculated based on at least the target cargo airflow rate.

The features, functions, and advantages that have been discussed may be achieved independently in various embodiments or may be combined in other embodiments further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

The present disclosure is directed towards an air handling system for distributing conditioned air between a passenger compartment and a cargo compartment of a vehicle. The air handling system includes a control module that is in electronic communication with a flow regulating valve. The flow regulating valve apportions airflow between the passenger compartment and the cargo compartment. Specifically, the control module determines a target passenger airflow rate based on a total number of occupants contained within the passenger compartment and the target cargo airflow rate. The target cargo airflow rate is based on the total available airflow rate, the target passenger airflow rate, and the system configuration. The control module instructs the flow regulating valve to actuate into a commanded position, thereby apportioning the airflow between the passenger compartment and the cargo compartment. The commanded position is calculated based on at least the target cargo airflow rate.

The following description is merely exemplary in nature and is not intended to limit the present disclosure, application, or uses.

Figure 1:
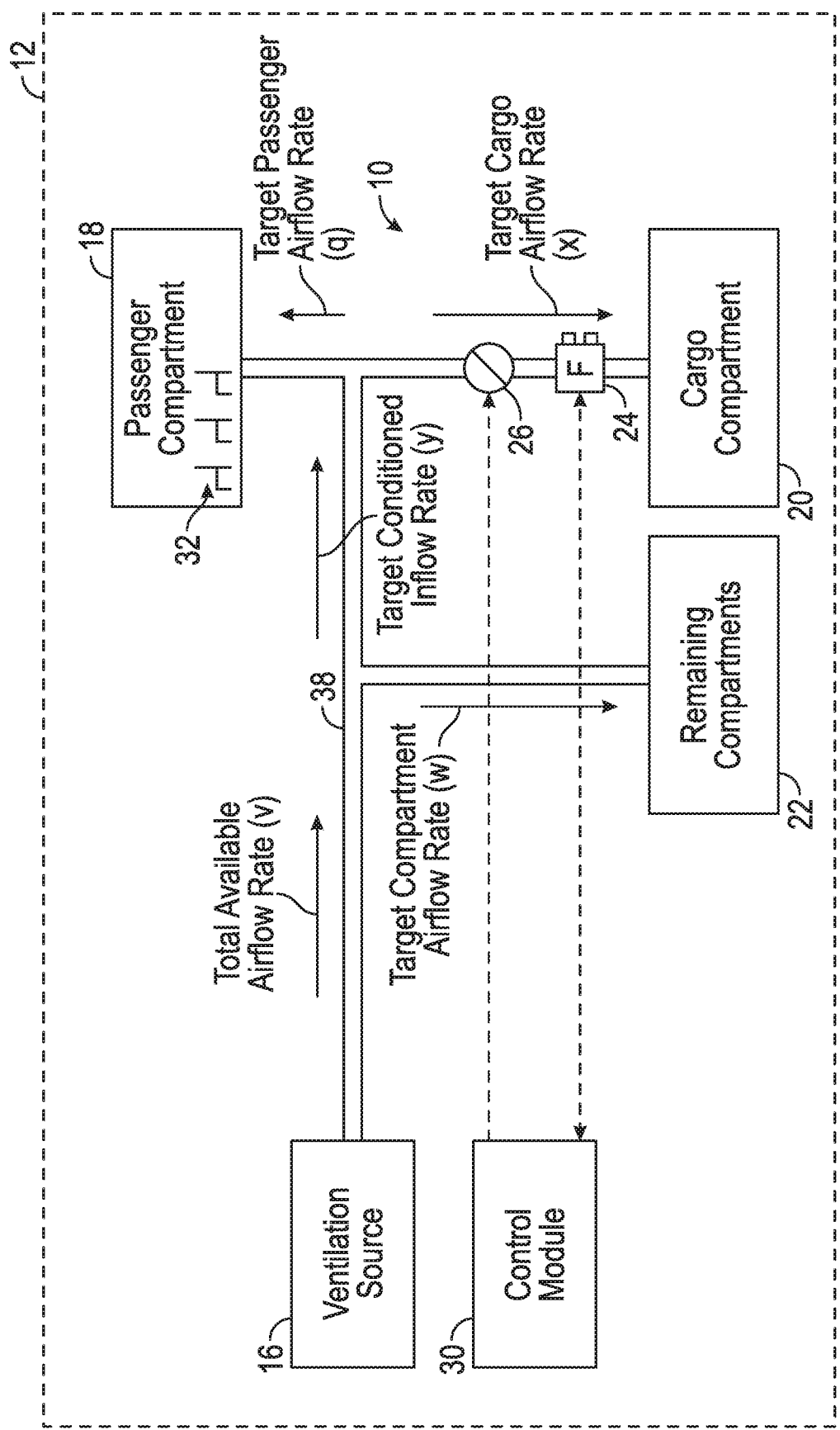
FIG. 1 is a schematic diagram of an exemplary air handling for a vehicle, where the vehicle includes a flow regulating valve configured to apportion airflow between passenger compartment and a cargo compartment, according to an exemplary embodiment.

Referring to FIG. 1, a schematic diagram of an exemplary air handling system 10 for a vehicle 12 is shown. The air handling system 10 includes a ventilation source 16, a passenger compartment 18, a cargo compartment 20, one or more remaining compartments 22, a flow rate sensor 24, a flow regulating valve 26, and a control module 30. The control module 30 is in electronic communication with the flow regulating valve 26 and the flow rate sensor 24. As explained below, the flow regulating valve 26 apportions airflow between the passenger compartment 18, the cargo compartment 20, and any remaining compartments 22 within the vehicle 12 that require airflow. For example, if the vehicle 12 is an aircraft, then the remaining compartments 22 include, but are not limited to, the flight deck, crown, overhead crew rests, and any galley spaces that are located outside of the passenger compartment 18.

The passenger compartment 18 is configured to accommodate one or more occupants. For example, in one embodiment the passenger compartment 18 includes one or more seats 32, where each seat 32 is configured to accommodate a passenger. In addition to the seats 32, the passenger compartment 18 also accommodates other occupants such as, for example, flight attendants on an aircraft. It is also to be appreciated that the passenger compartment 18 includes not only the area where passengers are seated, but other areas where occupants are located. For example, if the vehicle 12 is an aircraft, then the passenger compartment 18 includes areas such as lavatories, galleys, and any dedicated crew rest areas as well.

The cargo compartment 20 is not equipped to accommodate people, and instead contains cargo. Some examples of cargo include, but are not limited to, luggage, perishable goods such as produce, or live animals. For example, some passengers may choose to store their pets in the cargo compartment 20. It is to be appreciated that the heating, cooling, and ventilation requirements for the cargo compartment 20 is based on the specific type of cargo. For example, live animals such as pets or livestock require a temperature-controlled environment with adequate ventilation so the animals may breathe. Perishable goods, such as produce or meat, require a cooled environment. In contrast, goods such as luggage do not have similar the heating, cooling, and ventilation requirements as animals and perishable goods.

In an embodiment, the vehicle 12 is an aircraft and the air handling system 10 is part of an environmental control system (ECS). However, it is to be appreciated that the present disclosure is not limited to an aircraft. Instead, the vehicle 12 may be any type of land or marine vehicle that includes separate passenger and cargo compartments. For example, in one embodiment, the vehicle 12 is a ship or submarine. Many ships hold cargo in the hull, and the passenger compartment is located above the hull. In another example, some automobile transporting trains include a separate automobile cargo compartment and a separate passenger compartment within the same rail car.

The ventilation source 16 of the air handling system 10 is fluidly connected to the passenger compartment 18, the cargo compartment 20, and the remaining compartments 22 by a ducting system 38. The ventilation source 16 of the air handling system 10 containing a total available airflow rate (v) that is available to the vehicle 12. For example, in one non-limiting embodiment, if the vehicle 12 is an aircraft, then the ventilation source 16 is a mixing manifold. In an embodiment, the mixing manifold mixes outside air that has been adjusted for temperature and humidity with recirculated air from the passenger compartment 18. The total available airflow rate (v) exiting the mixing manifold of an aircraft is referred to as conditioned airflow. It is to be appreciated that although the mixing manifold is described as mixing together outside air with recirculated air, the total available airflow rate (v) is not limited to mixed air. Instead, the total available airflow rate (v) may include only outside air or, alternatively, only recirculated air.

Figure 6:
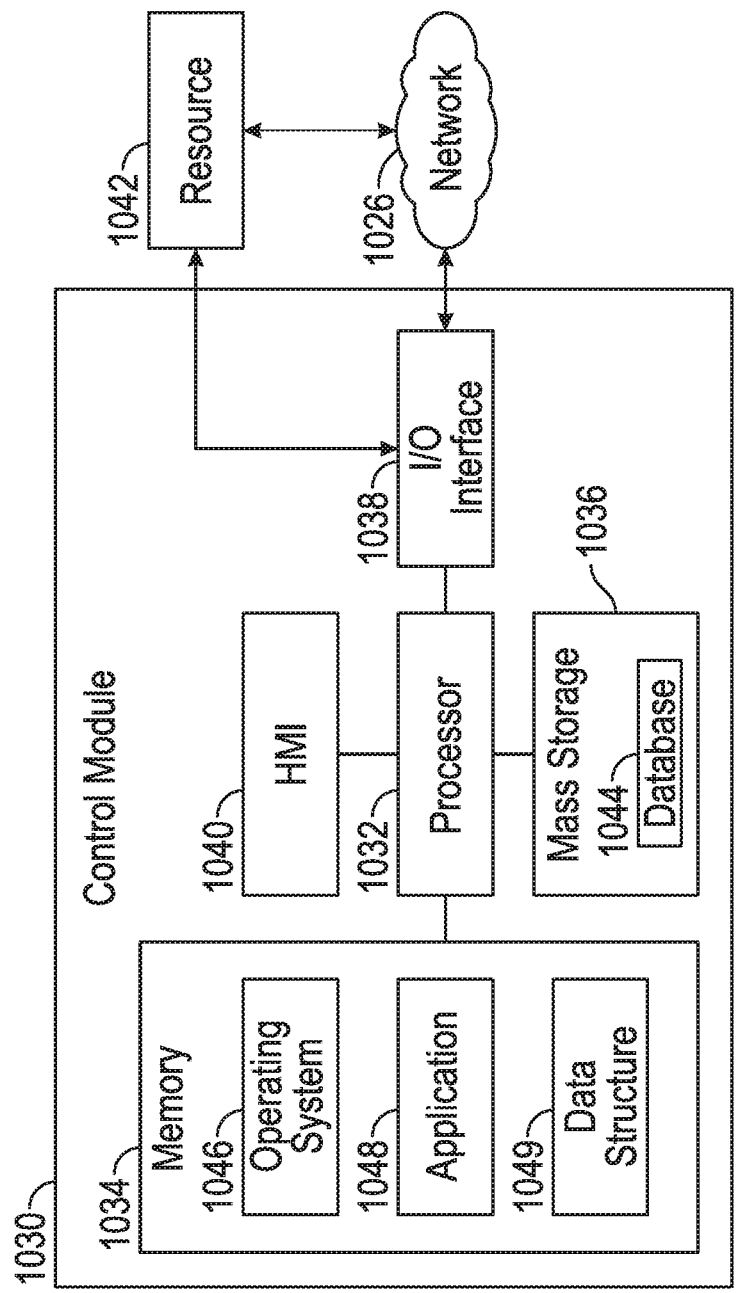
FIG. 6 is an illustration of a computer system used by the air handling system of FIG. 1, according to an exemplary embodiment.

Continuing to refer to FIG. 1, the passenger compartment 18 and the remaining compartments 22 both require a portion of the total available airflow rate (v). The airflow required by the remaining compartments 22, which is referred to as a target compartment airflow rate (w), is a constant input that is saved in a memory 1034 of the control module 30 (FIG. 6). The target compartment airflow rate (w) represents airflow required by any remaining compartments within the vehicle 12 that require the airflow. For example, if the vehicle 12 is an aircraft, then the target compartment airflow rate (w) includes the conditioned airflow required by at least one of the following: a flight deck, a crown, one or more overhead crew rests, and galley spaces that are located outside of the passenger compartment 18.

The control module 30 calculates the airflow required by the passenger compartment 18, which is referred to as a target passenger airflow rate (q). The target passenger airflow rate (q) is determined based on the total number of occupants contained within the passenger compartment 18. It is to be appreciated that the total number of occupants includes not only the passengers in the seats 32, but also any other individuals located within the passenger compartment 18. For example, the total number of occupants include flight attendants or other crew members as well. The control module 30 determines the target passenger airflow rate (q) by multiplying the total number of occupants contained within the passenger compartment 18 by a required airflow rate per occupant. The required airflow rate per occupant is a constant value saved in the memory 1034 of the control module 30 (FIG. 6). In an embodiment, the required airflow rate per occupant is determined based on regulatory standards or requirements of the vehicle 12.

The cargo compartment 20 is supplied with a remaining amount of airflow once the airflow requirements of the passenger compartment 18 and the remaining compartments 22 have been satisfied. The control module 30 determines the airflow supplied to the cargo compartment 20, which is referred to as a target cargo airflow rate (x). The target cargo airflow rate (x) is determined based on the total available airflow rate (v), the target passenger airflow rate (q), a system configuration, and the target compartment airflow rate (w). As mentioned above, if the vehicle 12 is an aircraft, then the target compartment airflow rate (w) is determined based on the conditioned airflow required by at least one of the following: a flight deck, a crown, one or more overhead crew rests, and galley spaces that are located outside of the passenger compartment 18.

The system configuration provides information indicating one or more operating conditions of the vehicle 12, requirements of the cargo compartment 20, and the surrounding environment. In one embodiment, the system configuration indicates the acceleration of the vehicle 12 and a load upon one or more engines (not shown of the vehicle). In another embodiment, if the vehicle 12 is an aircraft, then the system configuration includes a phase of flight of the aircraft. The system configuration further indicates system health of the vehicle 12. For example, if the vehicle 12 is an aircraft, the system health indicates items such as, but not limited to, issues with the electrical system, air conditioning system, a conditioned air distribution system, or a high-pressure unconditioned air supply system.

The system configuration further indicates temperature and ventilation requirements of the items contained within the cargo compartment 20. For example, if the cargo contained within the cargo compartment 20 includes live animals, then the temperature and ventilation requirements stipulate adequate airflow and temperature regulation for animals. Similarly, if the cargo is perishable goods such as produce, meat, or frozen food, then the temperature would need to be adjusted accordingly. On the other hand, if the cargo is luggage or other non-perishable goods, then the supply airflow and temperature is not as important when compared to transporting animals or perishable goods. Finally, in an embodiment, the system configuration also indicates ambient conditions such as, but not limited to, temperature, pressure, and humidity. The control module 30 determines if the target cargo airflow rate (x) is increased or decremented, within the limits imposed total available airflow rate (v), target compartment airflow rate (w), and target passenger airflow rate (q).

Figure 2:
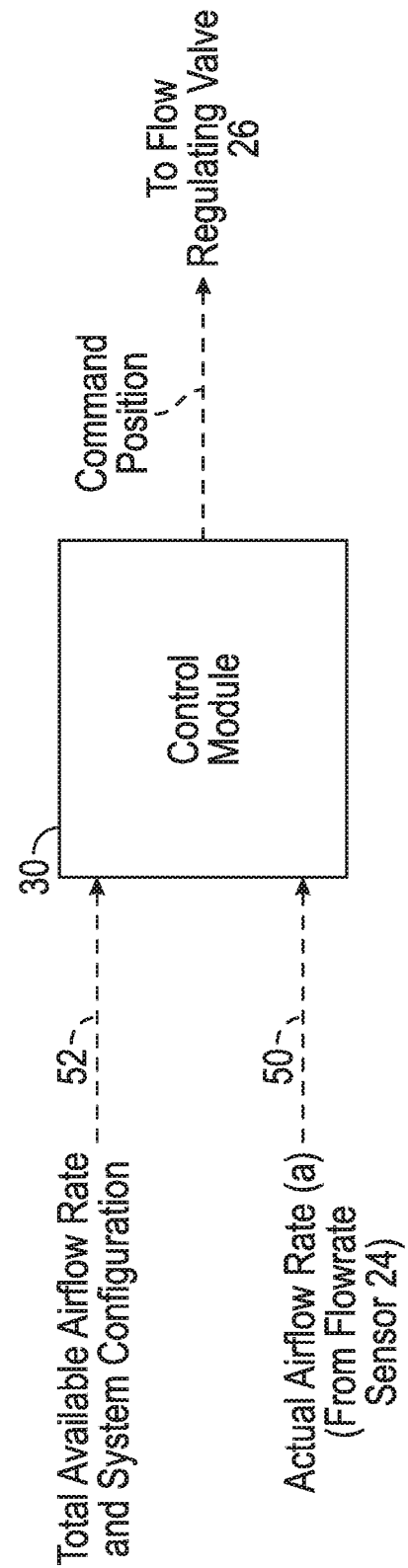
FIG. 2 is a diagram illustrating one approach for determining a commanded position of the flow regulating valve, according to an exemplary embodiment.
Figure 3:
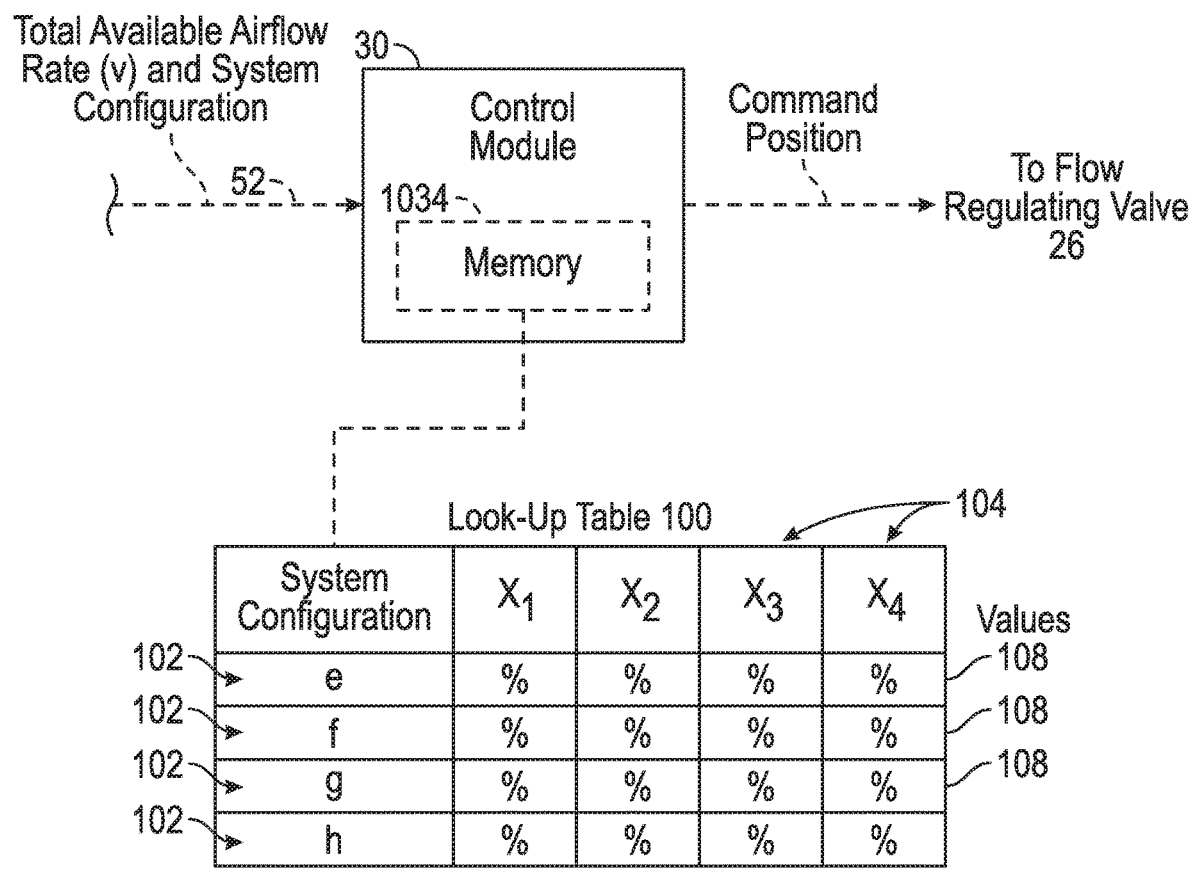
FIG. 3 is a diagram illustrating another approach for determining the position of the flow regulating valve, according to an exemplary embodiment.

The flow regulating valve 26 is configured to actuate into a commanded position to apportion the airflow between the passenger compartment 18 and the cargo compartment 20. The control module 30 instructs the flow regulating valve 26 to actuate into the commanded position, where the commanded position is calculated based on at least the target cargo airflow rate (x). Specifically, it is to be appreciated that the commanded position of the flow regulating valve 26 is determined based on one of two approaches. FIG. 2 illustrates a first approach for determining the commanded position of the flow regulating valve 26 based on the current amount of airflow that is provided to the cargo compartment 20, while FIG. 3 illustrates an alternative approach for determining the commanded position of the flow regulating valve 26 based on a look-up table 100.

Referring now to FIGS. 1 and 2, in one embodiment the control module 30 determines the commanded position of the flow regulating valve 26 with the purpose of reducing or substantially eliminating between the target cargo airflow rate (x) and an actual airflow rate (a) supplied to either the passenger compartment 18 or the cargo compartment 20, where the actual airflow rate is monitored by the flow rate sensor 24. In the embodiment as shown in FIG. 1, the flow regulating valve 26 is a butterfly valve, however, it is to be appreciated that other types of valves for apportioning airflow may be used as well such as, for example, a globe valve, a gate valve, a ball valve, and a plug valve. FIG. 1 also illustrates the flow rate sensor 24 is positioned downstream of the flow regulating valve 26 and upstream of the cargo compartment 20. Therefore, the control module 30 determines the commanded position of the flow regulating valve 26 based on the actual airflow rate (a) supplied to the cargo compartment 20. However, in another embodiment, the actual airflow rate (a) indicates the airflow supplied to the passenger compartment 18 instead, where the flow rate sensor 24 is positioned upstream of the passenger compartment 18.

The control module 30 receives a signal 50 indicating the actual airflow rate (a) supplied to either the passenger compartment 18 or the cargo compartment 20, which is measured by the flow rate sensor 24. The control module 30 determines the commanded position of the flow regulating valve 26 based on a difference between the actual airflow rate (a) supplied to the passenger compartment 18 and the target passenger airflow rate (q) or, alternatively, based on a difference between the actual airflow rate (a) supplied to the cargo compartment 20 and the target cargo airflow rate (x). If there is negligible or no difference between the actual airflow rate (a) supplied to the supplied to the passenger compartment 18 and the target passenger airflow rate (q), then the commanded position would instruct the flow regulating valve 26 to remain in the current position. Similarly, if there is negligible or no difference between the actual airflow rate (a) supplied to the supplied to the cargo compartment 20 and the target cargo airflow rate (x), then the commanded position would instruct the flow regulating valve 26 to remain in the current position.

It is to be appreciated that the commanded position attempts to maintain the least amount of difference between the target airflow rate and the actual airflow. Specifically, the commanded position attempts to maintain the least amount of difference between the actual airflow rate (a) supplied to the passenger compartment 18 and the target passenger airflow rate (q) or, alternatively, the least amount of difference between the actual airflow rate (a) supplied to the cargo compartment 20 and the target cargo airflow rate (x). Accordingly, it is to be appreciated that the approach shown in FIG. 2 is a feedback based approach for adjusting the airflow supplied to the cargo compartment 20.

In one embodiment, the total available airflow rate (v) may be varied based on the phase of flight and ambient conditions. As seen in FIG. 1, the ventilation source 16 of the air handling system 10 contains a target conditioned inflow rate (y) that is available to the vehicle 12. The target conditioned inflow rate (y) represents an adjustable or variable available inflow rate that ranges in value from zero to the total available airflow rate (v).

Referring now to FIGS. 1 and 3, in the alternative approach the control module 30 determines the commanded position of the flow regulating valve 26 based on the look-up table 100. The look-up table 100 may be stored within the local memory 1034 of the control module 30 or, alternatively, stored in a separate database or other computer. The look-up table 100 includes a plurality of commanded positions 108 of the flow regulating valve 26 that are provided for each individual system configuration and varying values of the target cargo airflow rate (x). For example, in the embodiment as shown, the look-up table 100 includes a plurality of rows 102 that each indicate a unique system configuration. In an example, the letter "f" indicates a system configuration where an aircraft is in a cruise phase of flight. The look-up table also includes a plurality of columns 104, where each column 104 indicates a unique value for the target cargo airflow rate (x). The look-up table further includes a plurality of commanded positions 108 that each represent a position of the flow regulating valve 26, where a specific commanded position 108 is provided for a specific configuration at each unique valve for the target cargo airflow rate (x). In the embodiment as shown, the plurality of commanded positions 108 are expressed as a percentage that the flow regulating valve 26 is open, however, it is to be appreciated that the commanded position of the flow regulating valve 26 may be expressed in other ways as well.

The control module 30 first determines the commanded position of the flow regulating valve 26. Specifically, this is accomplished by the control module 30 selecting one of the plurality of commanded positions 108 listed within the look-up table 100 and sending the commanded position 108 that was selected from the look-up table 100 to the flow regulating valve 26. In one non-limiting embodiment, the values of the commanded positions 108 of the flow regulating valve 26 within the look-up table 100 are verified by testing. That is, the values of the commanded positions 108 are determined are based on empirical data. However, in another embodiment the values may be based on simulation results. The control module 30 calculates the commanded positions 108 of the flow regulating valve 26 by selecting one of the commanded positions 108 within the look-up table 100. In one embodiment, the commanded position of the flow regulating valve 26 is determined based on interpolating the values of the commended positions 108. It is to be appreciated that the approach shown in FIG. 3 is not a feedback-based approach and does not require the flow rate sensor 24 shown in FIG. 1.

Figure 4:
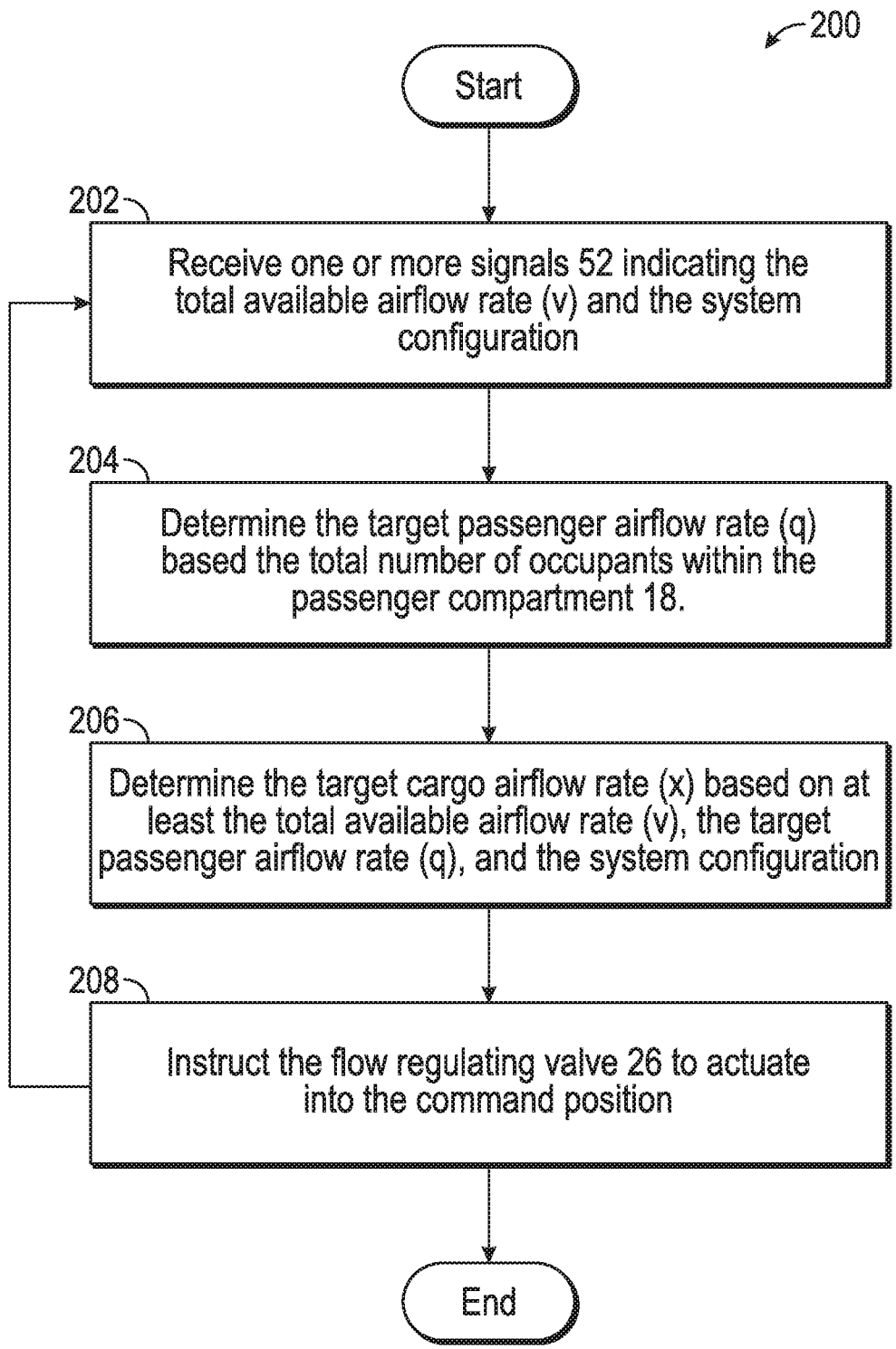
FIG. 4 is a process flow diagram illustrating a method for determining the commanded position of the flow regulating valve, according to an exemplary embodiment.

FIG. 4 is an exemplary process flow diagram illustrating a method 200 for apportioning airflow between the passenger compartment 18 and the cargo compartment 20 of the vehicle 12, such as an aircraft. The method 200 begins at block 202. In block 202, the control module 30 receives one or more signals 52 indicating the total available airflow rate available to the aircraft and the system configuration. For example, if the vehicle 12 is an aircraft, then the system configuration indicates at least the phase of flight and system health of the aircraft. The method 200 may then proceed to block 204.

In block 204, the control module 30 determines the target passenger airflow rate (q) based on a total number of occupants contained within the passenger compartment 18. The method 200 may then proceed to block 206.

In block 206, the control module 30 determines the target cargo airflow rate (x) based on at least the total available airflow rate (v), the target passenger airflow rate (q), and the system configuration. The method 200 may then proceed to block 208.

In block 208, the control module 30 instructs the flow regulating valve 26 to actuate into the commanded position. As mentioned above, the commanded position is calculated based on at least the target cargo airflow rate (x). The flow regulating valve 26 is configured to apportion conditioned air between the passenger compartment 18 and the cargo compartment 20. The method 200 may then terminate or return to block 202.

Figure 5A:
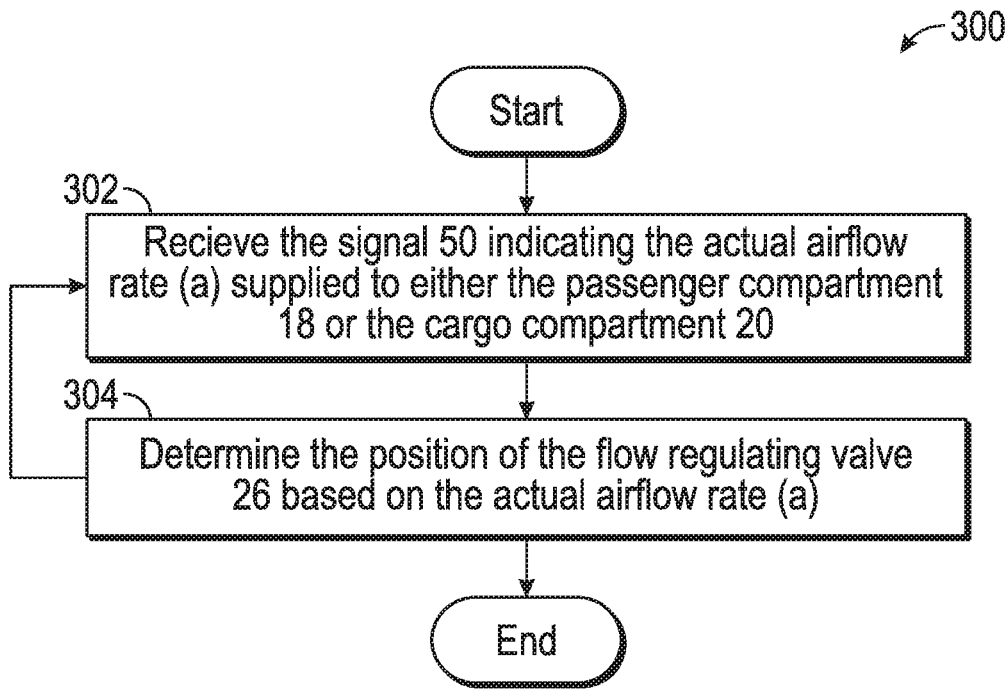
FIGS. 5A and 5B are process flow diagrams for determining the commanded position of the flow regulating valve according to the first approach shown in FIG. 2 and the second approach in FIG. 3, respectively, according to an exemplary embodiment.

FIG. 5A illustrates a method 300 for determining the commanded position of the flow regulating valve 26 by using the flow rate sensor 24. Referring now to FIGS. 1, 2, and 5A, the method 300 begins at block 302. In block 302, the control module 30 receives the signal 50 indicating the actual airflow rate (a) supplied to either the passenger compartment 18 or the cargo compartment 20 from the flow rate sensor 24. The method 300 then proceeds to block 304.

In block 304, the control module 30 determines the commanded position of the flow regulating valve 26 based on the actual airflow rate (a) supplied to either the passenger compartment 18 or the cargo compartment 20 and the corresponding target airflow rate (i.e., either the target passenger airflow rate (q) or the target cargo airflow rate (x)).

Figure 5B:
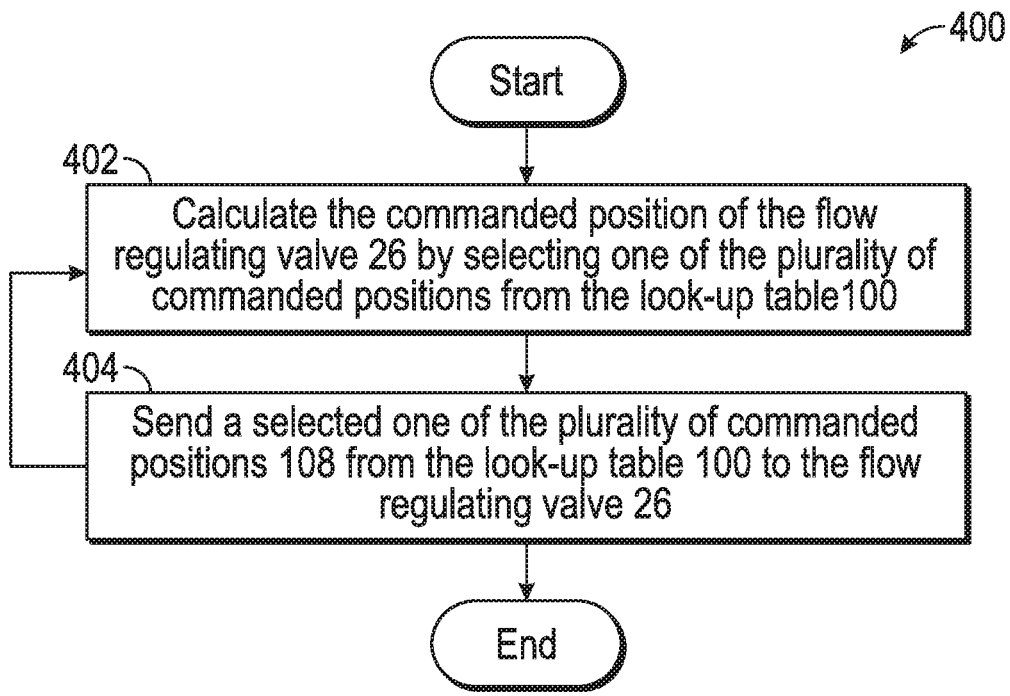

FIG. 5B illustrates a method 400 for calculating the commanded position of the flow regulating valve 26 by employing the look-up table 100 shown in FIG. 3. Referring now to FIGS. 3 and 5B, the method 400 begins at block 402. In block 402, the control module 30 calculates the commanded position by selecting one of the plurality of commanded positions 108 from the look-up table 100 based on the system configuration (i.e., one of the rows 102 in the look-up table 100) and the value of the target cargo airflow rate (x) (i.e., one of the columns 104 in the look-up table 100). The method 400 may then proceed to block 404.

In block 404, the control module 30 sends a selected one of the plurality of commanded positions 108 from the look-up table 100 to the flow regulating valve 26. The method 400 may then terminate or return to block 402.

Referring generally to the figures, the disclosed air handling system provides various technical effects and benefits. Specifically, the disclosed air handling system is configured to adjust the airflow supplied to the cargo compartment of a vehicle. Therefore, if there is excess airflow supplied to either the passenger compartment or the cargo compartment, the system may divert the excess airflow to the other remaining compartment. In contrast, conventional systems that are part of an aircraft may only supply a fixed amount of air to the cargo compartment. The disclosed air handling system also considers the specific type of cargo that is transported within the cargo compartment, unlike some conventional systems. Thus, the airflow provided to the disclosed cargo compartment may be adjusted to accommodate the heating, cooling, and ventilation needs of items such as, for example, perishable goods and live animals.

Referring now to FIG. 6, the control module 30 is implemented on one or more computer devices or systems, such as exemplary computer system 1030. The computer system 1030 includes a processor 1032, a memory 1034, a mass storage memory device 1036, an input/output (I/O) interface 1038, and a Human Machine Interface (HMI) 1040. The computer system 1030 is operatively coupled to one or more external resources 1042 via the network 1026 or I/O interface 1038. External resources may include, but are not limited to, servers, databases, mass storage devices, peripheral devices, cloud-based network services, or any other suitable computer resource that may be used by the computer system 1030.

The processor 1032 includes one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 1034. Memory 1034 includes a single memory device or a plurality of memory devices including, but not limited to, read-only memory (ROM), random access memory (RAM), volatile memory, non-volatile memory, static random-access memory (SRAM), dynamic random-access memory (DRAM), flash memory, cache memory, or any other device capable of storing information. The mass storage memory device 1036 includes data storage devices such as a hard drive, optical drive, tape drive, volatile or non-volatile solid-state device, or any other device capable of storing information.

The processor 1032 operates under the control of an operating system 1046 that resides in memory 1034. The operating system 1046 manages computer resources so that computer program code embodied as one or more computer software applications, such as an application 1048 residing in memory 1034, may have instructions executed by the processor 1032. In an alternative example, the processor 1032 may execute the application 1048 directly, in which case the operating system 1046 may be omitted. One or more data structures 1049 also reside in memory 1034, and may be used by the processor 1032, operating system 1046, or application 1048 to store or manipulate data.

The I/O interface 1038 provides a machine interface that operatively couples the processor 1032 to other devices and systems, such as the network 1026 or external resource 1042. The application 1048 thereby works cooperatively with the network 1026 or external resource 1042 by communicating via the I/O interface 1038 to provide the various features, functions, applications, processes, or modules comprising examples of the disclosure. The application 1048 also includes program code that is executed by one or more external resources 1042, or otherwise rely on functions or signals provided by other system or network components external to the computer system 1030. Indeed, given the nearly endless hardware and software configurations possible, persons having ordinary skill in the art will understand that examples of the disclosure may include applications that are located externally to the computer system 1030, distributed among multiple computers or other external resources 1042, or provided by computing resources (hardware and software) that are provided as a service over the network 1026, such as a cloud computing service.

The HMI 1040 is operatively coupled to the processor 1032 of computer system 1030 in a known manner to allow a user to interact directly with the computer system 1030. The HMI 1040 may include video or alphanumeric displays, a touch screen, a speaker, and any other suitable audio or visual indicators capable of providing data to the user. The HMI 1040 also includes input devices and controls such as an alphanumeric keyboard, a pointing device, keypads, pushbuttons, control knobs, microphones, etc., capable of accepting commands or input from the user and transmitting the entered input to the processor 1032.

A database 1044 may reside on the mass storage memory device 1036 and may be used to collect and organize data used by the various systems and modules described herein. The database 1044 may include data and supporting data structures that store and organize the data. In particular, the database 1044 may be arranged with any database organization or structure including, but not limited to, a relational database, a hierarchical database, a network database, or combinations thereof. A database management system in the form of a computer software application executing as instructions on the processor 1032 may be used to access the information or data stored in records of the database 1044 in response to a query, where a query may be dynamically determined and executed by the operating system 1046, other applications 1048, or one or more modules.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An air handling system for distributing airflow in a vehicle, comprising:
    a passenger compartment configured to contain one or more occupants;
    a cargo compartment;
    a flow regulating valve configured to actuate into a commanded position to apportion the airflow between the passenger compartment and the cargo compartment; and
    one or more processors in electronic communication with the flow regulating valve; and
    a memory coupled to the one or more processors, the memory storing data comprising a database and program code that, when executed by the one or more processors, causes the air handling system to:
        receive one or more signals indicating a total available airflow rate available to the vehicle and a system configuration, wherein the system configuration indicates one or more operating conditions of the vehicle;
        determine a target passenger airflow rate based on a total number of occupants contained within the passenger compartment;
        determine a target cargo airflow rate based on the total available airflow rate, the target passenger airflow rate, and the system configuration; and
        instruct the flow regulating valve to actuate into the commanded position to apportion the total available airflow rate between the passenger compartment and the cargo compartment, wherein the commanded position is calculated based on at least the target cargo airflow rate.

2. The air handling system of claim 1, further comprising a flow rate sensor in electronic communication with the one or more processors, wherein the flow rate sensor measures an actual airflow rate supplied to either the passenger compartment or the cargo compartment.

3. The air handling system of claim 2, wherein the one or more processors executes instructions to:
    receive a signal indicating the actual airflow rate supplied to either the cargo compartment or the passenger compartment from the flow rate sensor; and determine the commanded position of the flow regulating valve based on the actual airflow rate supplied to either the passenger compartment or the cargo compartment and a corresponding target airflow rate.

4. The air handling system of claim 1, further comprising a look-up table saved in the memory, wherein the look-up table includes a plurality of commanded positions of the flow regulating valve that are provided for each individual system configuration and varying values of the target cargo airflow rate.

5. The air handling system of claim 4, wherein the commanded position of the flow regulating valve is calculated by selecting one of a plurality of commanded positions included by the look-up table.

6. The air handling system of claim 1, wherein the one or more processors executes instructions to:
determine the target passenger airflow rate by multiplying the total number of occupants by a required airflow rate per occupant.

7. The air handling system of claim 1, wherein the system configuration further indicates temperature and ventilation requirements of items contained within the cargo compartment.

8. The air handling system of claim 1, wherein the system configuration indicates an acceleration of the vehicle and a load upon an engine of the vehicle.

9. The air handling system of claim 1, wherein the vehicle is an aircraft, and wherein the system configuration indicates a phase of flight of the aircraft.

10. The air handling system of claim 1, wherein the target cargo airflow rate is determined based on a required airflow to one or more remaining compartments of the vehicle.

11. An aircraft including an air handling system, the aircraft comprising:
a passenger compartment configured to contain one or more occupants;
a cargo compartment;
a mixing manifold containing conditioned airflow that is apportioned between the passenger compartment and the cargo compartment;
a flow regulating valve configured to actuate into a commanded position to apportion the conditioned airflow between the passenger compartment and the cargo compartment; and
one or more processors in electronic communication with the flow regulating valve; and
a memory coupled to the one or more processors, the memory storing data comprising a database and program code that, when executed by the one or more processors, causes the air handling system to:
receive one or more signals indicating a total available airflow rate available to the aircraft and a system configuration, wherein the system configuration indicates at least a phase of flight and system health of the aircraft;
determine a target passenger airflow rate based on a total number of occupants contained within the passenger compartment;
determine a target cargo airflow rate based on the total available airflow rate, the target passenger airflow rate, and the system configuration; and
instruct the flow regulating valve to actuate into the commanded position to apportion the total available airflow rate between the passenger compartment and the cargo compartment, wherein the commanded position is calculated based on at least the target cargo airflow rate.

12. The aircraft of claim 11, further comprising a flow rate sensor in electronic communication with the one or more processors, wherein the flow rate sensor measures an actual airflow rate supplied to the cargo compartment.

13. The aircraft of claim 12, wherein the one or more processors executes instructions to:
receive a signal indicating the actual airflow rate supplied to the cargo compartment from the flow rate sensor; and
determine the commanded position of the flow regulating valve based on the actual airflow rate supplied to the cargo compartment.

14. The aircraft of claim 11, further comprising a look-up table saved in the memory, wherein the look-up table includes a plurality of commanded positions of the flow regulating valve that are provided for each individual system configuration and varying values of the target cargo airflow rate.

15. The aircraft of claim 14, wherein the commanded position of the flow regulating valve is calculated by selecting one of a plurality of commanded positions included by the look-up table.

16. The aircraft of claim 11, wherein the system configuration further indicates temperature and ventilation requirements of items contained within the cargo compartment.

17. The aircraft of claim 11, wherein the target cargo airflow rate is determined based on the conditioned airflow required by at least one of the following: a flight deck, a crown, one or more overhead crew rests, and galley spaces that are located outside of the passenger compartment.

18. The aircraft of claim 11, wherein the one or more processors executes instructions to:
determine the target passenger airflow rate by multiplying the total number of occupants by a required airflow rate per occupant.

19. The aircraft of claim 11, wherein the system health of the aircraft monitors one or more of the following: an electrical system, an air conditioning system, a conditioned air distribution system, and a high-pressure unconditioned air supply system.

20. The aircraft of claim 11, wherein the system configuration further indicates one or more of the following ambient conditions: temperature, pressure, and humidity.

* * * * *